United States Patent [19]

Luber et al.

[11] Patent Number: 4,958,154

[45] Date of Patent: Sep. 18, 1990

[54] SYSTEM FOR WIRELESS REMOTE ACTUATION OF DIFFERING-SIREN PROGRAMS

[75] Inventors: Günter Luber; Wolfgang Heuer, both of Hildesheim; Hans O. Maly, Alfeld; Uwe Mätzold, Salzgitter; Rudolf Messerschmidt, Sibbesse, all of Fed. Rep. of Germany

[73] Assignee: Blaupunkt-Werke GmbH, Hildesheim, Fed. Rep. of Germany

[21] Appl. No.: 378,634

[22] Filed: Jul. 12, 1989

[30] Foreign Application Priority Data

Jul. 14, 1988 [DE] Fed. Rep. of Germany ....... 3823824

[51] Int. Cl.5 ......................... H04Q 7/00; G08B 1/08; G08B 27/00

[52] U.S. Cl. ......................... 340/825.690; 340/384 E; 340/471

[58] Field of Search ....................... 340/825.69, 825.62, 340/825.72, 825.44, 517, 521, 522, 539, 471, 534, 531, 384 E, 825.36; 455/205, 343

[56] References Cited

U.S. PATENT DOCUMENTS

| | | | |
|---|---|---|---|
| 4,499,603 | 2/1985 | Eilers | 340/825.72 |
| 4,688,021 | 8/1987 | Buck et al. | 340/384 E |
| 4,768,022 | 8/1988 | Patterson | 340/384 E |

*Primary Examiner*—Donald J. Yusko
*Assistant Examiner*—Peter S. Weissman
*Attorney, Agent, or Firm*—Frishauf, Holtz, Goodman & Woodward

[57] ABSTRACT

A programming unit (1) for ON-OFF switching of a siren or similar warning device can be provided with remote actuation capability by connecting it to a radio receiver tuner (27) and radio data signal decoder (25). The output of the signal decoder (25) is connected to a block decoder (12). Some of the block decoder outputs are connected to a comparison circuit (8) which attempts to match a broadcast siren address with a stored address uniquely identifying the associated siren program unit (1). In the event of a match, a set of flip-flops and gates controls loading of information at other block decoder outputs into a siren program buffer memory (4) and then into an end memory (3) attached to and controlling the program unit (1). After a siren program is performed, end memory (3) is reset.

7 Claims, 2 Drawing Sheets

SYSTEM FOR WIRELESS REMOTE ACTUATION OF DIFFERING SIREN PROGRAMS

Cross-reference to related U.S. patent and applications assigned to Blaupunkt Werke GmbH, the disclosures of which are hereby incorporated by reference: U.S. Pat. No. 3,949,401, HEGELER; U.S. Pat. Nos. 4,435,843 and 4,450,589, EILERS & BRAGAS; U.S. Pat. No. 4,499,603, EILERS; Ser. No. 07/307,349, LUBER et al., filed Feb. 7, 1989; Ser. No. 07/307,353, LUBER et al., filed Feb. 7, 1989.

The present invention relates generally to remote actuation of siren programs and, more particularly, to wireless actuation of an individual selected siren by decryption of a broadcast signal. The invention is also applicable to fire horns, warning beacons, and the like.

BACKGROUND:

Sirens are switched on and off in particular sequences, according to the nature of the danger against which the population is being warned. For example, one code sequence can be used for a tornado, a second for a forest fire, a third for a toxic chemical cloud or reactor malfunction, a fourth for foreign invasion. Similarly, some volunteer fire departments use coded signals to indicate which firemen should respond, or to what location. In the course of modernizing siren installations, it is desirable to provide wireless remote actuation capability.

THE INVENTION:

It is a primary object of the present invention to permit selective actuation of a remotely located warning device such as a siren by a non-directional signal, such as a broadcast signal which may impinge upon more warning devices than one wishes to actuate. It is a further object of the invention to permit remote selection of the siren ON-OFF sequence or program.

Briefly, the preferred embodiment of the invention decodes a radio data signal from a subcarrier of a broadcast signal and attempts to match a siren address in the received signal with a stored siren address or identification number which is uniquely associated with the siren installation to which the receiver is attached. If the two addresses match or coincide, other parts of the decoded radio data signal are passed to the siren programming unit,

DRAWINGS:

Two alternate embodiments of the invention are illustrated in the drawings, of which FIG. 1 is a schematic diagram of a first embodiment; and FIG. 2 is a schematic diagram of a second embodiment.

DETAILED DESCRIPTION

In both embodiments of the invention, the wireless remote actuation of the sirens is preferably accomplished by means of a signal which is transmitted as an amplitude modulation of an auxiliary carrier, e.g. 57 kiloHertz, in a normal FM broadcast signal which can be received by every broadcast tuner. Such auxiliary carrier signals are described in more detail in the patents and applications cross-referenced at the beginning of the present specification.

Figure 1:
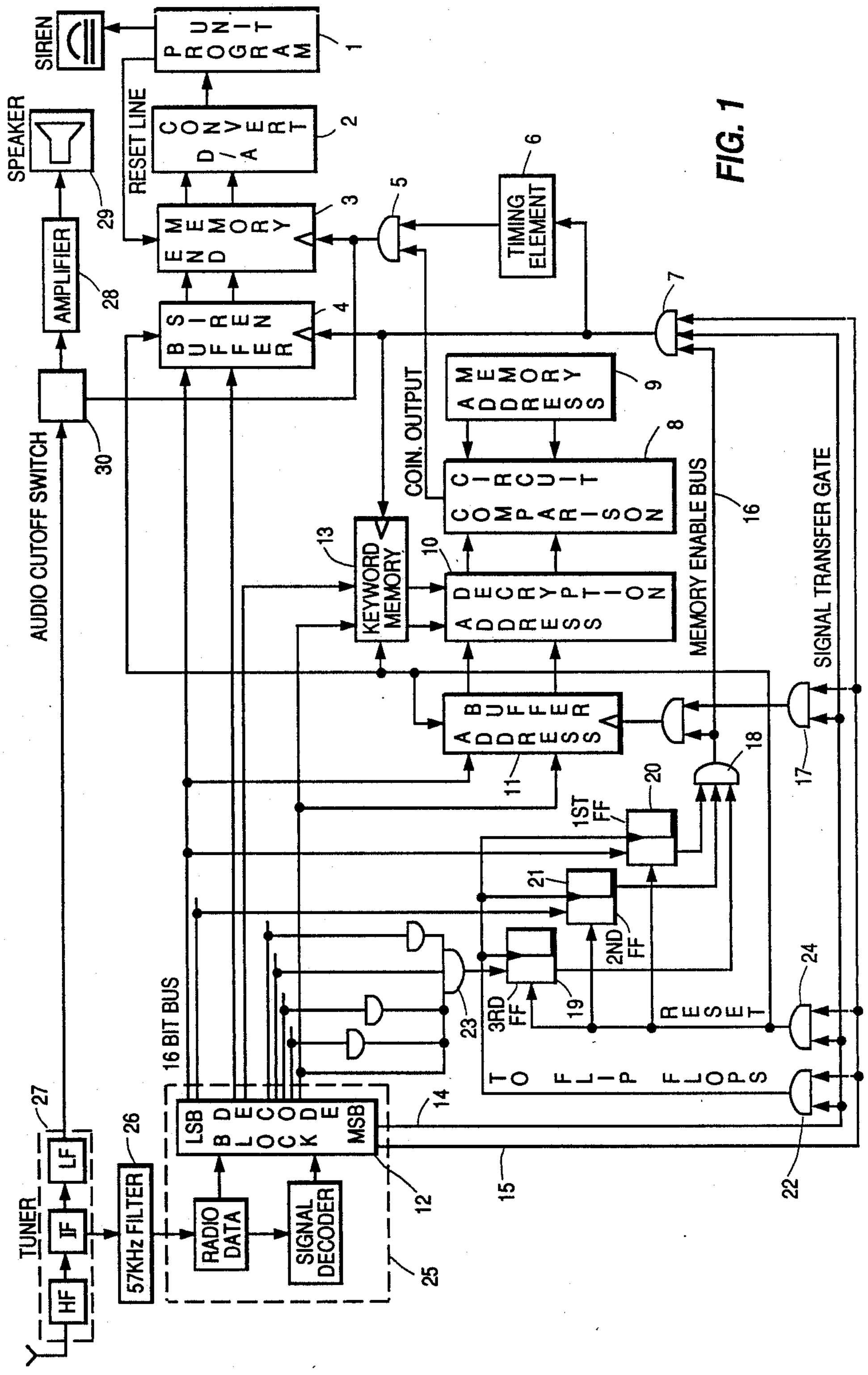

As shown in FIG. 1, the remote actuation system is triggered by signals from a remote signal reception means such as a broadcast tuner 27. Other signalling schemes such as optical signals could also be used. For reproduction of any voice broadcast which accompanies the siren actuation signal in case of emergency, an audio amplifier 28 is connected to an output of tuner 27, and a speaker 29 is connected to an output of amplifier 28. An audio cutoff switch 30 can also be provided.

For actuation of the siren, the Intermediate Frequency (IF) stage of tuner 27 has an output connected to a 57 kHz filter 26. For demodulation of the control signal from the auxiliary carrier amplitude, a radio data signal decoder 25 is provided, connected to the output of filter 26. Decoder 25 includes an amplitude demodulator, a clocking bit regenerator, and a block decoder 12. The amplitude demodulator furnishes a bit stream to the block decoder 12. This radio data signal decoder structure is standard and well known.

Block decoder 12 has a 16-bit-wide signal output. Further, the decoder has additional outputs connected respectively to a block clock bus 14 and to a block number bus 15. These two buses 14, 15 control four clocking gates 24, 22, 17 and 7. Gate 24 is associated with a first block clock signal and furnishes a RESET signal to all memories and flip-flops in the system. Gate 22 is associated with a second block clock signal and controls transfer of signals into three flip-flops 19, 20, 21. Gates 17 and 7 are associated with the remaining third and fourth block clock signals and control the transfer of signals into and out of the memories of the system.

The signal to set first flip-flop 20 is provided by the Least Significant Bit (LSB) output of the 16-bit-wide signal output of block decoder 12. The output adjacent the LSB output provides the signal to set second flip-flop 21. The signal to set third flip-flop 19 is provided by an AND-gate 23 whose inputs are connected to the Most Significant Bit (MSB) output of decoder 12 and the four bit outputs adjacent the MSB output.

The outputs from third and first flip-flops 19, 20, directly controlled by the RESET pulse, and the output from second flip-flop 21, indirectly controlled by the RESET pulse, are fed to an AND-gate 18, whose output is connected to the memory release or enable bus 16 which prepares the aforementioned transfer of signals into buffer memory in the system.

In the first embodiment illustrated in FIG. 1, the 16 signal outputs of block decoder 12 are connected to the signal inputs of a 16-bit-wide buffer memory 11 for the encrypted siren address or siren identification number. Signal acquisition is actuated via signal transfer AND-gate 17. Thus, an appropriately coded broadcast signal can specify which individual siren is to be actuated.

Parallel to this, the half of the block decoder outputs which includes the MSB output is connected to the signal inputs of an 8-bit-wide buffer memory 13 for the keyword. The other half of the block decoder outputs which include's the LSB output is connected to an 8-bit-wide buffer memory 4 for the siren program to be generated. The signal transfer into this siren buffer 4 is controlled via AND-gate 7.

The 16 outputs of address buffer 11 and the 8 outputs of keyword buffer memory 13 are connected to a corresponding number of inputs of an address decryption circuit 10, whose 16-bit-wide output is connected to a corresponding 16-bit-wide signal input of a comparison circuit 8. The second information to be compared by comparison circuit 8 is furnished by an address memory 9, in which a predetermined, characteristic 16-bit-wide address or identification number of the associated siren installation is permanently recorded or stored.

If the address at the output of decryption circuit 10 matches the address at the output of address memory 9, then comparison circuit 8 generates over its match or coincidence output line a signal to a transfer gate 5. Gate 5 is in the transfer input line of end memory 3. The signal from comparison circuit 8 prepares gate 5 for the block clock pulse from gate 7, as delayed by a timing element 6 which is in series between the output of gate 7 and one of the two inputs of gate 5.

The signal inputs of this 8-bit-wide end memory 3 acquire the information about the siren program to be generated from siren buffer 4, whenever the comparison circuit 8 recognizes, in the received broadcast signal, the address of the attached siren program unit 1. The thus-acquired or stored command in end memory 3 specifies the sequence of ON- and OFF-switching of the siren. At the end of each siren program, program unit 1 sends a RESET pulse back to a RESET input of end memory 3.

Whenever this digital control system is retrofitted onto a siren installation having an older, analog program unit 1, one can additionally provide a Digital-to-Analog (D/A) converter 2, which translates the 8-bit-wide digital signal from end memory 3 into an appropriate control signal adapted to the analog unit 1.

According to the regulations in some jurisdictions, e.g. the Fed. Rep. of Germany, governing radio data signals, the first data block of each test or transmission contains the identification of the transmitter. In the above-described system, the recognition of the transmitter ID is unnecessary, since siren control is generally permanently specified or provided by a predetermined warning transmitter in the FM band. Therefore, the clock pulse associated with the first block of the radio data signal generates a RESET to flip-flops 19, 20, 21 and all of the buffer memories 4, 11, 13.

Responsive to the clock pulse associated with the second block, the flip-flops 19, 20, 21 are SET via gate 22, whenever block decoder 12 has signals ready at the outputs connected to the flip-flops.

Responsive to the clock pulse associated with the third block, the block-decoded signals of this third block are transferred into address buffer 11 as authorized by gate 17, in the event that flip-flop 21 was not set in the preceding clock cycle.

Responsive to the clock pulse associated with the fourth block, gate 7 enables transfer into address buffer 11 of the half of the output signals from block decoder 12 which include the MSB output. These 8 output signals represent the keyword. Gate 7 also enables transfer into siren buffer 4 of the signals at the other 8 outputs, including the LSB output, of block decoder 12. These signals represent the siren program to be generated.

If, after the fourth block, the right address is at the output of address decryption circuit 10, the fourth block, as delayed by timing element 6, actuates the transfer of the contents of siren buffer 4, representing the siren program commands, into end memory 3, and the siren sequence is generated.

Responsive to the first block of the following group, the buffer memories and the flip-flops are again RESET. End memory 3 by contrast receives a RESET pulse only when program unit 1 indicates the end of the generated siren sequence.

If the transmission of the ON-command for the sirens is made with a normal audio program transmitter, the reproducton of the normal audio program may be undesired. In that event, a switch 30 is provided in series between the audio output of tuner 27 and the audio amplifier 28. Switch 30 has a control input connected to the output of gate 5.

Figure 2:
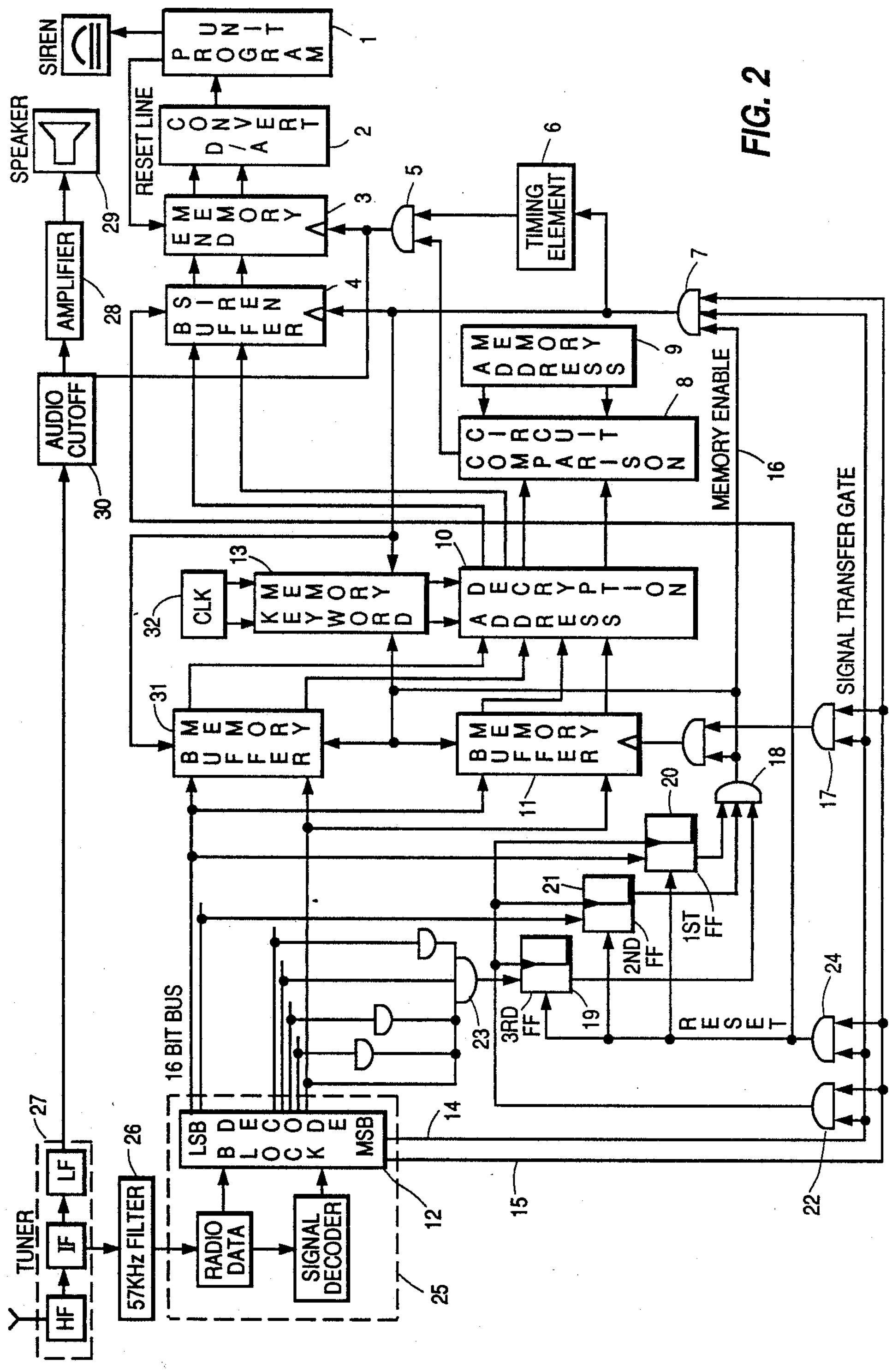

FIG. 2 illustrates the second embodiment of the invention. The 16 signal outputs of block decoder 12 are connected to two respective 16-bit-wide inputs of buffer memories 11 and 31. While buffer 11, as in the first embodiment, acquires the information at the outputs of block decoder 12 at the third block, buffer 31 acquires the information at the outputs of block decoder 12 at the fourth block. For this purpose, the transfer-enable input of buffer 31 is connected to the output of gate 7. Keyword buffer memory 13 is provided with a timer 32. This timer 32, e.g. a broadcast clock, calls up in memory 13, for a respective unit of time, an associated keyword stored there. With this keyword, one can decrypt both the siren address and the siren program to be generated, from the 32-bit-side data word contained in buffers 11 and 31. Comparison circuit 8 compares the address word with the siren address contained in address memory 9, while the command for the siren program to be generated is transferred into siren buffer 4, which in this second embodiment has inputs connected to six outputs of decryption circuit 10.

The further processing, of the siren program command stored in siren buffer 4 and of the output signal of comparison circuit 8, is carried out in this second embodiment in the same manner as in the first embodiment.

Various changes and modifications are possible within the scope of the inventive concept. In particular, features from one of the embodiments can be combined with features from the other.

We claim:

1. System for wireless remote actuation of siren programs, comprising a siren program unit (1);

an end memory (3) having an output connected to said program unit (1);

a siren buffer memory (4) for storing a siren program to be generated, connected to inputs of said end memory (3);

a first transfer-enable gate (5) having an output connected to a transfer-enable input of said end memory (3);

a comparison circuit (8) having a coincidence output connected to a first input of said transfer-enable gate (5);

a timing element (6) having an output connected to a second input of said transfer-enable gate (5);

an address memory (9) storing an address characteristic of said siren program unit (1), individually, and having outputs connected to said comparison circuit (8);

an address decryption circuit (10) having outputs connected to said comparison circuit (8);

a block decoder (12) having inputs connected to a source (25, 26, 27) of groups of four blocks of data and outputs connected, via an address buffer memory (11, 31), to a first input of said address decryption circuit (10);

a keyword buffer memory (13) having outputs connected to a second input of said address decryption circuit (10);

a second transfer-enable gate (7), responsive to a fourth one of said data blocks, having an output connected to a transfer-enable input of said siren buffer memory (4) and to a transfer-enable input of said keyword buffer memory (13);

a third transfer-enable gate (17), responsive to a third one of said data blocks, having an output connected to a transfer-enable input of said address buffer memory (11);

and wherein said source of groups of data words is a remote signal reception means (25, 26, 27).

2. System according to claim 1, wherein said remote signal reception means is a radio data signal decoder (25) connected to an output of a radio tuner (27); and further comprising a block clock bus (14) and a block number bus (15) connected to respective outputs of said block decoder (12);

first flip-flop (20) connected to a Least-Significant-Bit (LSB) output of said block decoder;

a second flip-flop (21) connected to a next-to-Least-Significant-Bit (LSB) output of said block decoder;

a third flip-flop (19) connected to a Most-Significant-Bit (MSB) output and a plurality of MSB-adjacent outputs of sad block decoder;

a gate (18) having inputs connected to outputs of each of said flip-flops and an output;

a memory enable bus (16) connected from said output of said gate (18) to said second transfer-enable gate (7);

a further gate (22) having inputs connected to said block clock and block number buses (14, 15) and an output connected to a respective enable input of each of said flip-flops (19,20, 21);

a further gate (24) having inputs connected to said block clock and block number buses (14, 15) and an output connected to a respective RESET input of each of said flip-flops (19,20, 21).

3. System according to claim 2, wherein said tuner (27) detects a primary carrier frequency and a subcarrier frequency, and said radio data signal decoder (25) detects a modulation of said subcarrier.

4. System according to claim 1, wherein said siren buffer memory (4) storing said siren program has inputs connected to a first set of outputs of said block decoder (12) including a Most-Significant-Bit (MSB) output thereof;

said keyword buffer memory (13) has inputs connected to a second set of outputs of said block decoder (12); and said siren buffer memory and said keyword buffer memory each have a transfer-enable input connected to an output of said second transfer-enable gate (7).

5. System according to claim 4, further comprising a digital-to-analog converter (2) having an output connected to said programming unit (1) and an input connected to an 8-bit-wide output of said end memory (3); and wherein said siren buffer memory (4) is 8 bits wide;

said transfer-enable gate (5) has an output connected to said end memory (3), and a first control input connected via a timing element (6) with said second transfer-enable gate (7), and a second control input connected to said coincidence output of said 16-bit-wide comparison circuit (8);

said comparison circuit has a pair of 16-bit-wide inputs, one connected to said 16-bit-wide address memory (9) and one connected to said address decryption circuit (10);

said address buffer memory (11) has a 16-bit-wide input connected to outputs of said block decoder (12) and a 16-bit-wide output connected to said address decryption circuit (10);

said address decryption circuit (10) has an 8-bit-wide input connected to said keyword memory (13);

said keyword memory has inputs connected to a first half of the outputs of said block decoder (12) including the Most-Significant-Bit (MSB) output thereof; and said siren buffer memory has inputs connected to a second half of the outputs of said block decoder (12), including the Least-Significant-Bit (LSB) output thereof.

6. System according to claim 1, wherein (FIG. 2)

a timer (32) is provided, connected to inputs of said keyword buffer memory; and said siren buffer memory (4) has inputs connected to a subset of the outputs of said address decryption circuit (10).

7. System according to claim 1, further comprising a tuner (27) having an output connected to an input of said radio data signal decoder (25);

an audio amplifier (28) connected to an output of an audio stage of said tuner (27);

a speaker (29) connected to an output of said amplifier (28);

and means (30) responsive to an output signal of said first transfer-enable gate (5) for suppressing audible output from said speaker (29).

* * * * *